United States Patent
Raut et al.

(10) Patent No.: US 11,836,472 B2
(45) Date of Patent: Dec. 5, 2023

(54) SYSTEM AND METHOD FOR BROWSER BASED POLLING

(71) Applicant: Dell Products L.P., Round Rock, TX (US)

(72) Inventors: Anil Kumar Raut, Plano, TX (US); Ravi Vijaykumar Vanjani, Carrollton, TX (US); Andy Clark Coleman, Allen, TX (US); Mark Philip Anderson, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 17/371,209

(22) Filed: Jul. 9, 2021

(65) Prior Publication Data
US 2023/0009108 A1    Jan. 12, 2023

(51) Int. Cl.
*G06F 8/65*    (2018.01)
*G06F 11/07*   (2006.01)
*G06F 9/48*    (2006.01)

(52) U.S. Cl.
CPC ............ *G06F 8/65* (2013.01); *G06F 9/4881* (2013.01); *G06F 11/0709* (2013.01); *G06F 11/0793* (2013.01)

(58) Field of Classification Search
CPC .............................. G06F 8/65; G06F 11/0709
See application file for complete search history.

(56) References Cited

U.S. PATENT DOCUMENTS

| | | | |
|---|---|---|---|
| 2002/0138624 A1* | 9/2002 | Esenther | H04L 9/40 709/227 |
| 2003/0172128 A1* | 9/2003 | Bloomquist | G06F 16/957 709/219 |
| 2005/0097159 A1* | 5/2005 | Skidgel | G06F 16/954 709/200 |
| 2016/0171682 A1* | 6/2016 | Abedini | G16H 30/20 382/132 |

* cited by examiner

*Primary Examiner* — Duy Khuong T Nguyen
(74) *Attorney, Agent, or Firm* — Terrile, Cannatti & Chambers; Emmanuel A. Rivera

(57) ABSTRACT

A system, method, and computer-readable medium are disclosed for browser based polling of jobs used to build a web page of a web application. A web browser builds the web page of the web application and connects with one or more web services for jobs used to build the web page of the web application. A reusable service from a library is downloaded and is used at the web browser to poll the jobs as they are received from the web services. Polling the jobs is performed until download is complete. The web page application is updated when the download is complete.

20 Claims, 5 Drawing Sheets

SYSTEM AND METHOD FOR BROWSER BASED POLLING

BACKGROUND OF THE INVENTION

Field of the Invention

The present invention relates to the management of information handling systems. More specifically, embodiments of the invention provide a system, method, and computer-readable medium for browser based polling to support multi-user single page web applications.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Web applications can run on information handling systems. When a single page web application is built and provided to a user of an information handling system, data can be pulled by the information client acting as a client or pushed by a server providing data to the client. Determining how the data is being sent should be performed to assure that complete and correct data is provided to the web application. One tool is "polling" the server if data or events actually have been sent. Typically, single web page applications have the need to queue up "http" requests that are executed asynchronously. Monitoring such tasks can be difficult. For example, the ability to know whether "http" requests from a client to server finish successfully or error out, can complicate the buildup and use of single web page applications. Furthermore, typical server based polling solutions require a channel between server and client. Such a channel must remain open while polling takes place.

SUMMARY OF THE INVENTION

A system, method, and computer-readable medium are disclosed for browser based polling of jobs used to build a web page of a web application comprising starting a web browser to build the web page of the web application; connecting with one or more web services for jobs used to build the web page of the web application; downloading a reusable service from a library that is used at the web browser to poll the jobs as they are received from the web services; polling the jobs until download is complete; and updating the web page application when the download is complete.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for browser based polling to support multi-user single page web applications. Implementations provide for browser based polling that is reusable and has the ability to save data in a session without the need to fetch the server for multi-user single page web application.

Implementations provide for queuing "http" requests from a client device and monitoring requests until good status or error status is returned. Implementations include a micro service to provide a reusable library to support the browser based polling. In particular, the reusable library can contain a service or element used by a web application for the browser based polling. This allows the ability to check on status of a number of jobs in progress and provide real-time updates. A user of the client device is allowed to navigate within the web application. Furthermore, implementations allow the ability to configure use across multiple web application pages. A user is able to return to a particular web application page which is active and has jobs running/downloading.

Implementations provide that when an "http" request fails the browser based polling can re-subscribe on an error as to a reconfigurable number of times as desired. Polling can stop when a condition is met, such as successful job completion, when a web application is destroyed, or when an error occurs. Memory as to polling is kept.

Furthermore, implementations can provide for users of client devices to request to fetch data, which can be accomplished using the micro service to combine the polling stream and allow using manual fetching of data using one stream by, for example the use of "RXJS" merge operator.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
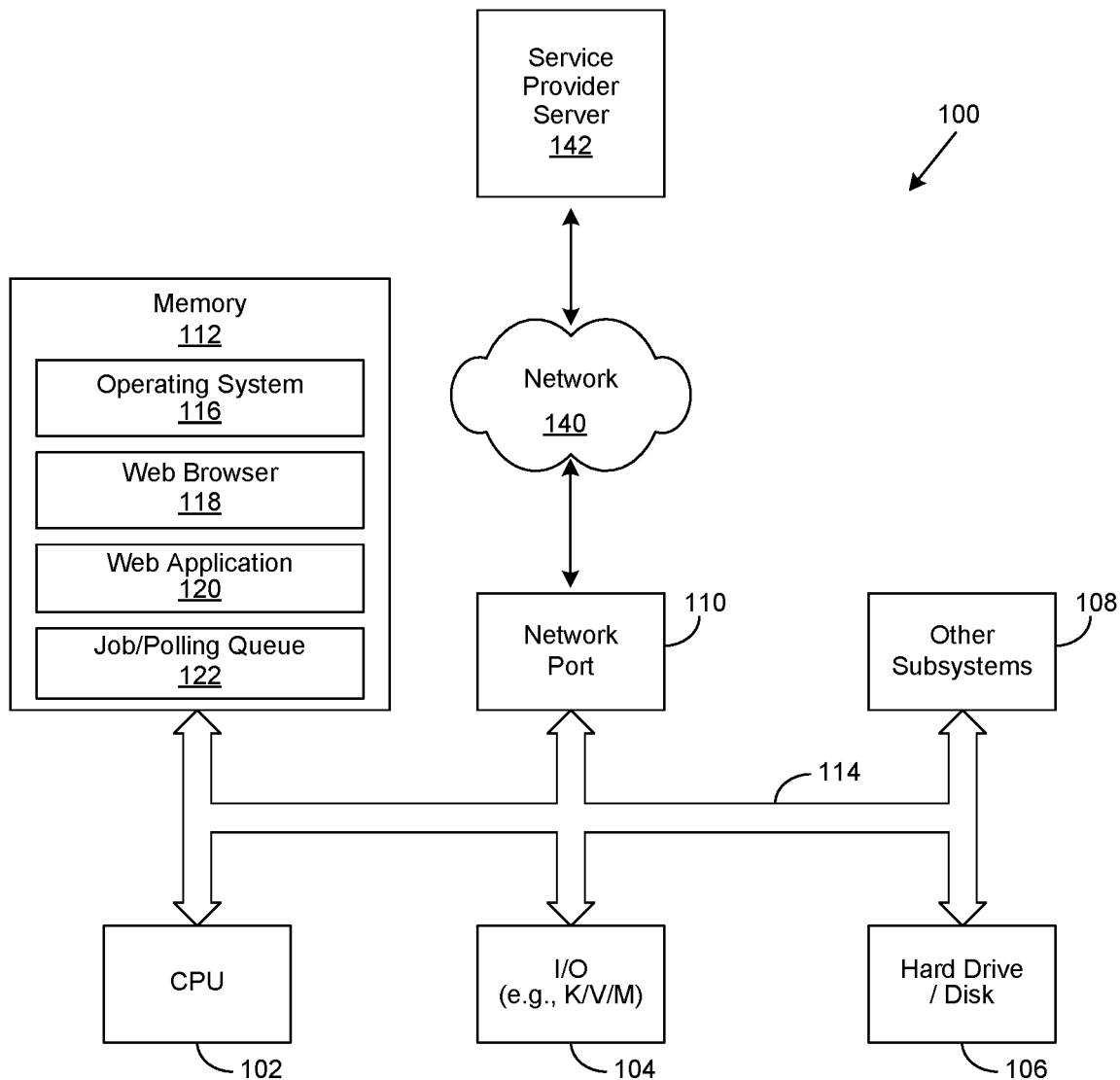
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 further comprises operating system (OS) 116. In various implementations, the system memory 112 can include a web browser 118, a web application 120, and job/polling queue 122 which are further described herein.

Figure 2:
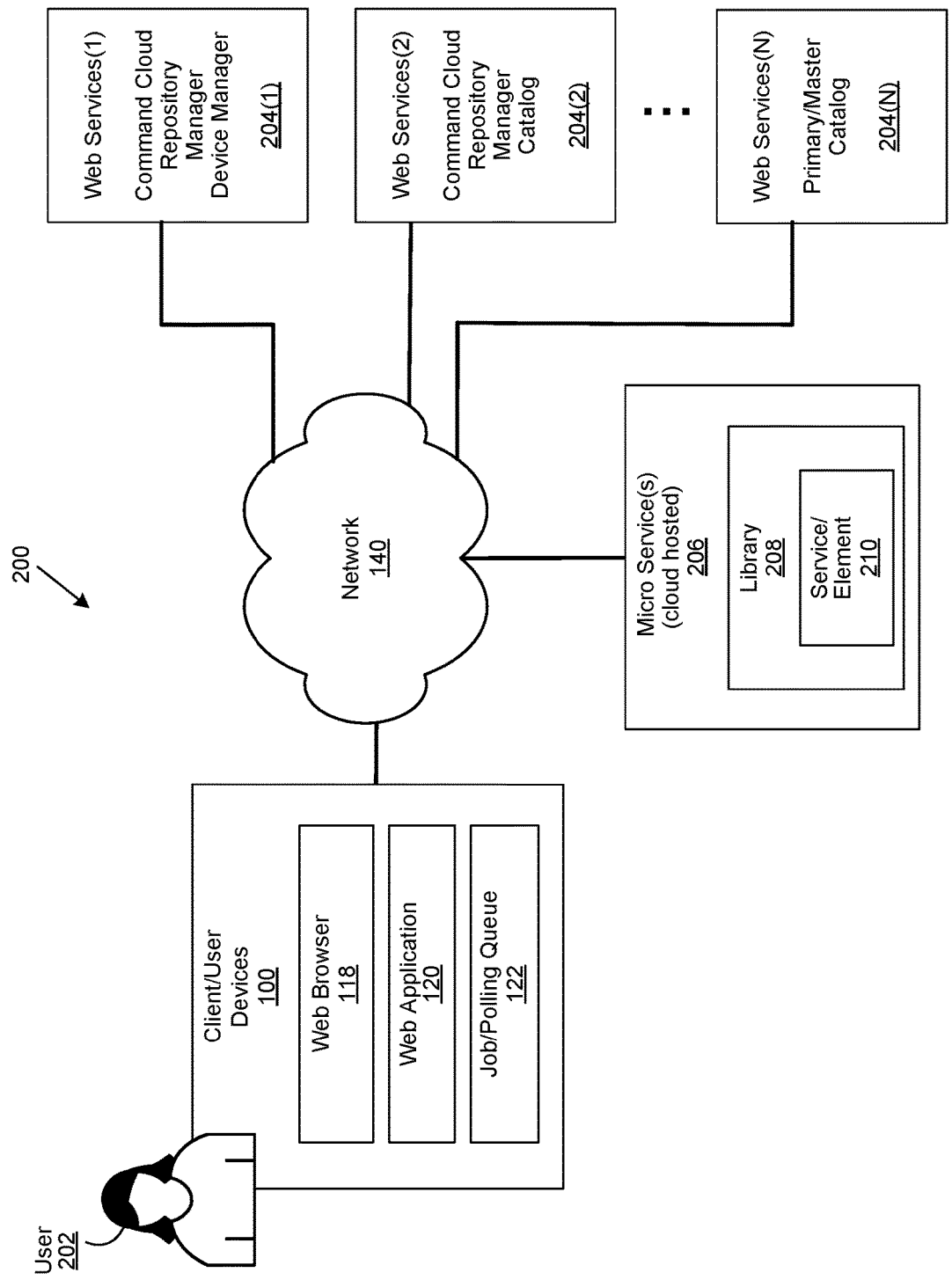
FIG. 2 is an example of a system for browser based polling to support multi-user single page web applications.

FIG. 2 shows a system 200 for browser based polling to support multi-user single page web applications. The system 200 includes client/user devices or information handling system 100 as described in FIG. 1, which are connected to the network 140. A user 202 accesses the client/user device or information handling system 100.

As discussed, the information handling system 100 or client/user devices 100 include the web browser 118, the web application 120, and the job/polling queue 122. Web browser 118 can be one of several available browsers, such as Firefox®, Google Chrome®, Microsoft Edge®, Apple Safari®, Opera®, etc. In various implementations, the web browser 118 connects with one or more web services 204(1) to 204(N). For example, web service(1) 204(1) can be a command cloud repository manager device manager, web service(2) 204(2) can be a command cloud repository manager device manager catalog, and web service(N) 204(N) can be a primary/master catalog.

The web browser 118 accesses data from the web services 204(1) to 204(N) to build a web page for web application 120. The web application 118 uses the web browser 118 to provide a particular function. Examples of such functions include online forms, word processors, email programs, spreadsheets, etc. The data can include drivers, and other code needed by the web browser 118 to provide a function. Communication between the web browser and web services 204(1) to 204(N) can be through an application programming interface or API and implemented using the Representational State Transfer (REST) architecture.

Implementations provide for the job/polling queue 122 to track the jobs received by the client/user device 100 from the web services 204. Implementations provide for the system 200 to include a micro service(s) 206. Embodiments can provide for micro service(s) 206 to be cloud based. The micro service(s) 206 provides a library 208 which includes reusable code (functionality) implemented at client/user device 100 to perform browser based polling. In certain implementations, a service/element 210 is provided and installed on client/user device 100. As further described herein, using the service/element 210 (i.e., code provided by the library 208) and job/polling queue 122 browser based polling is supported at the client/user device 100.

In certain implementations, an asynchronous request is sent from the client/user device 100 or web browser 118 to micro service(s) 206. The request can be to create a catalog that includes a listing of software components and drivers for the web application 120. The job/polling queue 122 provides polling status for a determined configurable period or interval (e.g., 10 seconds) to the micro service(s) 206, since some time is needed for a draft version of the catalog to update the software components and drivers. The browser based polling is used to poll continuously per the determined configurable period to get to steady state. In a similar way, when user 202 through client/user device 100 downloads a test or production version of a catalog, web services 204 can take some time to page the ".xml" files and download exe file. Again, the browser based polling is used to poll continuously per the determined configurable period to get to steady state.

If the micro service(s) 206 determines a status error, the status error is returned to the client/user device 100 or web browser 118. The 100 or web browser 118 performs polling after the error response, and job/polling queue 122 provides polling status for a determined period (e.g., 10 seconds) to the micro service(s) 206. If the jobs are complete, then the micro service(s) 206 returns a status successful to the client/user device 100 or web browser 118. The job or jobs are unsubscribed from job/polling queue 122 at completion.

Figure 3:
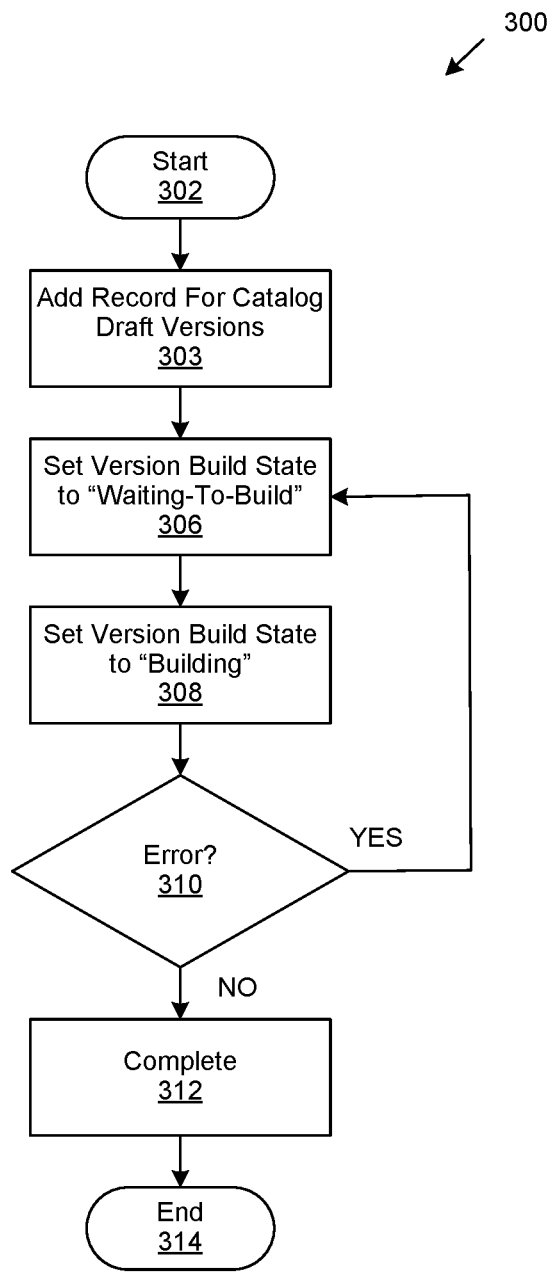
FIG. 3 is a generalized flowchart for creating a catalog of job events for browser based polling.

FIG. 3 is a generalized flowchart 300 for creating a catalog of job events for browser based polling. In certain implementations, the process 300 is performed by the micro service(s) 206 as described in FIG. 2. The order in which the method is described is not intended to be construed as a limitation, and any number of the described method blocks may be combined in any order to implement the method, or alternate method.

At step 302, the process 300 starts. At step 304, a record is added for particular catalog versions. Step 304 can be performed when the user client/user device 100 or web browser 118 requests for a catalog to be created.

At step 306, version build state is set to "waiting-to-build". Step 306 can be performed while polling status is being provided by the job/polling queue 122 to micro service(s) 206.

At step 308, version build state is set to "building." Step 308 can be performed while status is returned by being provided by the micro service(s) 206 to the job/polling queue 122.

A determination as to an error is performed at step 310. If an error has occurred, then following the YES branch of 310, step 306 is performed. Else, if no error, job is complete at step 312. The micro service(s) 206 can return a status successful to the client/user device 100 or web browser 118. At step 314, the process 300 ends.

Figure 4:
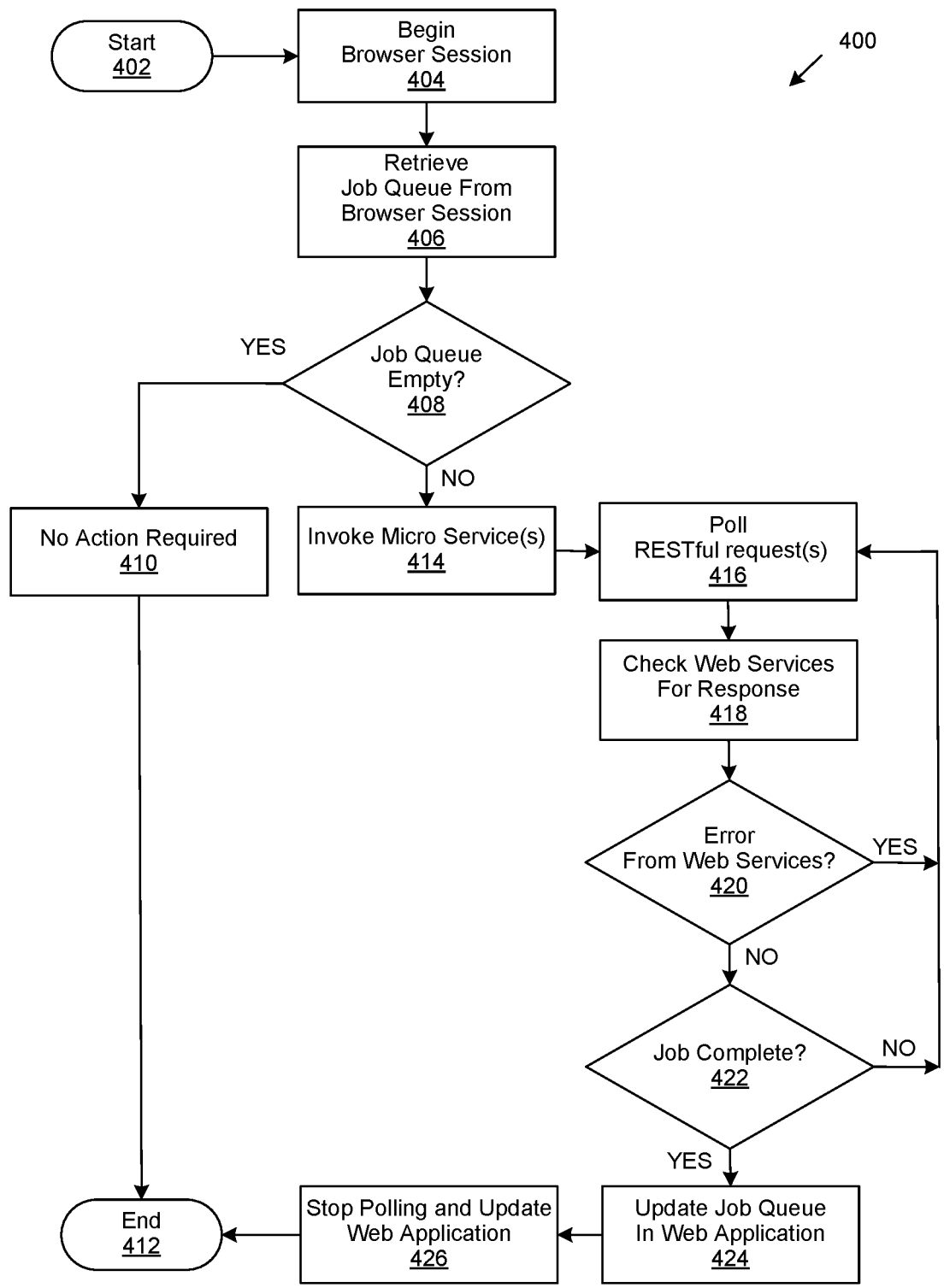
FIG. 4 is generalized flowchart for browser based polling between a client/user device and micro service(s)

FIG. 4 is a generalized flowchart 400 for browser based polling between a client/user device and micro service(s). The order in which the method is described is not intended to be construed as a limitation, and any number of the described method blocks may be combined in any order to implement the method, or alternate method.

At step 402, the process 400 starts. At step 404, a web browser session is started at client/user device 100. In particular, the web browser 118 builds a web page for web application 120. At step 406, jobs are received from web services 204 to build the web page of web application 120. Jobs in job/polling queue 122 are retrieved from the web browser session.

A determination is performed at step 408 whether the job queue is empty. If the job queue is empty, then following the YES branch of step 408, at step 410, no action is needed. At step 412, the process 400 ends.

Else if the job queue is not empty, following the NO branch of step 408, at step 414, micro service(s) 206 is invoked. At step 416, the micro service(s) 206 polls RESTful requests of the client/user device 100. At step 418, the micro service(s) 206 checks responses from the web services 204.

A determination is performed at step 420 whether there is an error from web services 204. If there is an error, then following the YES branch of step 420, step 416 is performed. Else if there is no error from web services 204, then following the NO branch of step 420, a determination is performed at step 422 whether the job is complete.

If the job is not complete, then following the NO branch of step 422, step 416 is performed. If the job is complete, then following the YES branch, at step 424, the job queue is updated. At step 426, the web application 120 is updated and polling is stopped. At step 412, the process 400 ends.

Figure 5:
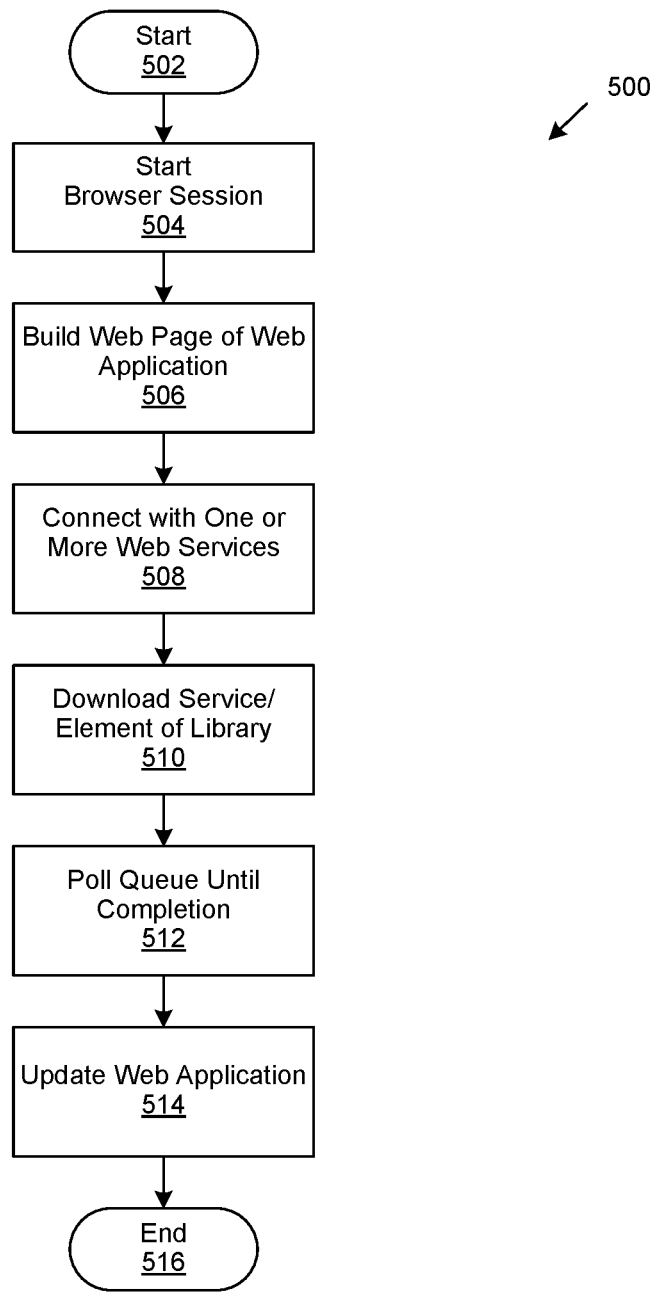
FIG. 5 is generalized flowchart for browser based polling to support multi-user single page web applications.

FIG. 5 is a generalized flowchart 500 for browser based polling to support multi-user single page web applications. The order in which the method is described is not intended to be construed as a limitation, and any number of the described method blocks may be combined in any order to implement the method, or alternate method.

At step 502, the process 500 starts. At step 504, web browser 118 is started at the client/user device 100. At step 506, the web browser 118 starts a build of a web page of a web application 120. At step 508, the web browser 118 connects with one or more web services 204 to download jobs that are used to build the web page of web application 118. At step 510, the client/user device 100 downloads a reusable polling service/element 210 of the library 208 used to poll the jobs. At step 512, the job/polling queue is polled until completion of downloading of the jobs. At step 514, the web page application 118 is updated upon completion. At step 516, the process 500 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for browser based polling of jobs used to build a web page of a web application comprising:

starting a web browser to build the web page of the web application;

connecting with one or more web services for jobs used to build the web page of the web application;

downloading a reusable service from a library that is used at the web browser to poll the jobs as they are received from the web services;

polling the jobs until download of the reusable service is complete, wherein the polling checks on status of a number of jobs in progress and provides real-time updates as to status; and updating the web page application when the download of the reusable service is complete.

2. The method of claim 1, wherein a catalog is created of a listing of software components and drives from the web services is created during the polling.

3. The method of claim 1, wherein the web services include one or more of a command cloud repository manager device manager, command cloud repository manager device manager catalog, and primary/master catalog.

4. The method of claim 1, wherein the polling is performed over a configurable period or interval.

5. The method of claim 1 further comprising checking for errors and polling for requests of jobs.

6. The method of claim 1 further comprising stopping the polling when the web application is destroyed or when an error occurs.

7. The method of claim 1 further comprising commuting with a micro service to perform the browser based polling.

8. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for browser based polling of jobs used to build a web page of a web application and comprising instructions executable by the processor and configured for:

starting a web browser to build the web page of the web application;

connecting with one or more web services for jobs used to build the web page of the web application;

downloading a reusable service from a library that is used at the web browser to poll the jobs as they are received from the web services;

polling the jobs until download of the reusable service is complete, wherein the polling checks on status of a number of jobs in progress and provides real-time updates as to status; and updating the web page application when the download of the reusable service is complete.

9. The system of claim 8, wherein a catalog is created of a listing of software components and drives from the web services is created during the polling.

10. The system of claim 8, wherein the web services include one or more of a command cloud repository manager device manager, command cloud repository manager device manager catalog, and primary/master catalog.

11. The system of claim 8, wherein the polling is performed over a configurable period or interval.

12. The system of claim 8 further comprising checking for errors and polling for requests of jobs.

13. The system of claim 8 further comprising stopping the polling when the web application is destroyed or when an error occurs.

14. The system of claim 8 further comprising commuting with a micro service to perform the browser based polling.

15. A non-transitory, computer-readable storage medium embodying computer program code, the computer program code comprising computer executable instructions configured for:

starting a web browser to build the web page of the web application;

connecting with one or more web services for jobs used to build the web page of the web application;

downloading a reusable service from a library that is used at the web browser to poll the jobs as they are received from the web services;

polling the jobs until download of the reusable service is complete, wherein the polling checks on status of a number of jobs in progress and provides real-time updates as to status; and updating the web page application when the download of the reusable service is complete.

16. The non-transitory, computer-readable storage medium of claim 15, wherein a catalog is created of a listing of software components and drives from the web services is created during the polling.

17. The non-transitory, computer-readable storage medium of claim 15, wherein the web services include one or more of a command cloud repository manager device manager, command cloud repository manager device manager catalog, and primary/master catalog.

18. The non-transitory, computer-readable storage medium of claim 15, wherein the polling is performed over a configurable period or interval.

19. The non-transitory, computer-readable storage medium of claim 15 further comprising checking for errors and polling for requests of jobs.

20. The non-transitory, computer-readable storage medium of claim 15 further comprising stopping the polling when the web application is destroyed or when an error occurs.

* * * * *